United States Patent [19]

Frohn

[11] Patent Number: 4,624,286
[45] Date of Patent: Nov. 25, 1986

[54] DEGASIFYING VALVE FOR CONTAINERS

[76] Inventor: Walter Frohn, Geiselgasteigstrasse 100, D-8000 Munich 90, Fed. Rep. of Germany

[21] Appl. No.: 719,755

[22] Filed: Apr. 4, 1985

[30] Foreign Application Priority Data

Apr. 11, 1984 [DE] Fed. Rep. of Germany ... 8411409[U]

[51] Int. Cl.$^4$ ............................................. F16K 15/14
[52] U.S. Cl. .................................... 137/859; 137/197; 220/373; 220/374
[58] Field of Search ............... 137/197, 843, 859, 860, 137/852; 220/208, 209, 373, 374

[56] References Cited

U.S. PATENT DOCUMENTS

| 1,350,610 | 8/1920 | Henig | 137/859 |
| 3,374,805 | 3/1968 | Trevarrow, Jr. | 137/843 |
| 3,454,182 | 7/1969 | Morton | 220/374 |
| 3,921,849 | 11/1975 | Fernberg et al. | 220/373 |
| 4,036,393 | 7/1977 | Neiman | 220/374 |
| 4,512,499 | 4/1985 | Uuskallio | 220/374 |

FOREIGN PATENT DOCUMENTS

| 2323630 | 11/1973 | Fed. Rep. of Germany | 220/374 |
| 2091388 | 7/1982 | United Kingdom | 137/843 |

Primary Examiner—George L. Walton
Attorney, Agent, or Firm—Collard, Roe & Galgano

[57] ABSTRACT

A degasifying valve for storage and/or transport containers especially for the storage and/or transportation of dangerous liquids has a base provided with a degasifying orifice which on the downstream side of this base is surrounded by at least one annular rib. Biased towards that rib or those ribs respectively, is a diaphragm-like spring element covering at least the area enclosed by the rib or the ribs, respectively.

17 Claims, 6 Drawing Figures

DEGASIFYING VALVE FOR CONTAINERS

BACKGROUND OF THE INVENTION

The present invention relates to a degasifying valve for storage and/or transport containers, especially for the storage and/or transportation of dangerous liquids, comprising a base provided with a degasifying orifice, the downstream mouth of said orifice being surrounded by a valve seat, and a spring element being biased into sealing contact with said valve seat.

Such a degasifying valve may be arranged in the wall of the container as well as in the cover of the container.

In the chemical sector dangerous liquids must be stored or transported, respectively, which split off more or less gaseous materials which might set under pressure the container, if no precautions have been made for gas-escape. Gas-escape is made possible by degasifying valves which must be able to prevent the at least partially dangerous liquids from escaping together with the gaseous materials.

At present mushroom-shaped degasifying valves made of silicon rubber are used. These valves are provided with a shaft which is pressed into a degasifying orifice of the cover of the container, a ring-shaped swelling of the shaft abutting on the inner surface of the top plate of the cover, whereas the rim of the convex valve head is abuting on the outer surface of said top plate by influence of a biasing force which depends on the thickness of the top plate and the distance between valve head and ring-shaped swelling. The ring-shaped swelling is provided with a groove extending in the direction of gas flow through the orifice and allowing the escape of the gas when the pressure of the gas lifts off the rim of the valve head from the outer surface of the top plate of the cover. When gas escapes gas pressure descends and the rim of the valve head will again abut on the outer surface of the top plate.

In many cases this mushroom-shaped valve is arranged in a plastic housing and is mounted in the top plate of the cover together with this housing. The function is the same as described above.

Years ago thin circular metal plates were inserted into the top plate of the cover which were split radially so that the plates would bend by the influence of gas pressure thereby opening slots allowing the escape of the gas. However, escape of the dangerous liquid cannot be fully avoided by this very construction.

But also the above mentioned mushroom-shaped valve is not able to meet strict security requirements. Nearly all of the elastic and flexible plastic materials which may be used for this valve construction are not resistent when coming into contact with most of the dangerous liquids. In some cases the valve bodies swell, so that at least the spring characteristic changes and as a result the biasing force and the opening pressure, whereas in cases of extreme swelling the function of the valve will be seriously disturbed and even blocked. As a further result the pressure in the container may increase to such an extent that the container may be destroyed. In other cases the valves are totally destroyed when moistened by aggressive liquids thus allowing the escape of dangerous liquids.

OUTLINE OF THE INVENTION

For this reason it is the object of the invention to design a degasifying valve of high reliability which prevents to an utmost extent the liquid from being carried away during the degasifying and which has a simple structure to be assembled easily, and being extremely flat in order to enable their mounting under most different conditions.

In order to effect this and further objects, the valve seat is formed by at least one ring-shaped rib and the spring element is a diaphragm-like spring element covering at least the area enclosed by said valve seat.

There are known various constructions of degasifying valves which cause a change of the gas flow direction on that side of the degasifying orifice which faces the interior of the container so that during the degasifying or in case of an inside splashing of the liquid this liquid should not flow as far as to the degasifying orifice. However, it is an experience that in spite of such an arrangement the liquid will reach the degasifying orifice. But with the present invention advance of the liquid beyond the degasifying orifice is restricted by means of the ring-shaped rib enclosing a store room for the liquid in case it should perhaps pass the degasifying orifice, and from there the liquid may return to the interior of the container via this orifice. Some ribs with different diameters provide a kind of radial labyrinth gland without enlarging the overall size of the valve.

The arrangement of the valve seat in form of a ring-shaped rib surrounding the degasifying orifice in combination with the flat diaphragm-like valve body results in a particularly good sealing effect.

A more detailed account of the invention will now be given on the basis of working examples to be seen in the figures.

LIST OF DIFFERENT VIEWS OF THE DRAWINGS

DETAILED ACCOUNT OF WORKING EXAMPLES OF THE INVENTION

Figure 1:
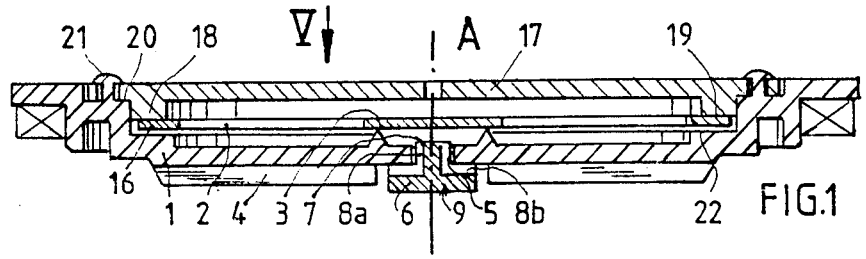
FIG. 1 is a sectional view of a first embodiment of a degasifying valve.
Figure 5:
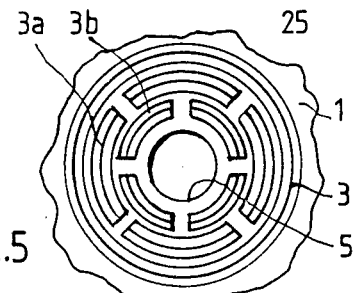
FIG. 5 is a partial top view of the base of a further modified embodiment of a degasifying valve looking in the direction of arrow V in FIG. 1.
Figure 6:
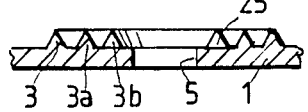
FIG. 6 is a section through the modified embodiment shown in FIG. 5.

A base 1 of the valve has the shape of a rotational body in relation to a central axis W (FIG. 1). This base 1 is provided with a central degasifying orifice 5 and has the function of a valve seat plate cooperating with a diaphragm-like spring element 2 positioned downstream of the degasifying orifice 5, i.e. on that side of the base 1 which later on is called the "upper side". On this upper side of the base 1 the degasifying orifice 5 is surrounded by at least one circular rib 3 having the profile of a knife edge. In the modified embodiment shown in FIGS. 5 and 6 the base 1 is provided with three circular ribs 3, 3a, 3b of different diameters. In order to obtain a good chemical stability and to allow a certain plastic deformation in the area of the ribs 3, 3a, 3b the base 1 is made of polyethylene, and preferably of polyethylene of high molecular weight. The lower surface of base 1 may be provided with ribs extending in a radial direction in order to improve dimensional stability.

A stepped plug 6 has a shaft 7 and a cover plate 9. The cover plate 9 is overlapping the border of the degasifying orifice 5 on the lower side of the base 1 facing the interior of the container not shown in the figures. Plug 6 is made of polyethylene. The surface of shaft 7 is provided with grooves 8a extending in the direction of the degasifying flow through the orifice 5. These grooves 8a may be replaced by recesses in the side wall of the orifice 5. The surface of the cover plate 9 facing the base 1 is provided with grooves 8b which communicate with respective grooves 8a thus forming gas escape channels which are bent at right angles. The upstream portion 8b of these gas escape channels extends in parallel with the lower surface of base 1, i.e. at right angles in relation to the possible direction of an inside splashing of the liquid. This results in an extensive consumption of energy of the splashing liquid prior to its entering of the downstream portions 8a of the gas escape channels. The change of flow direction consumes part of the remaining flow energy. The consumption of an important part of the flow energy of the splashing liquid and the greatly reduced sectional area of the gas escape channels will in most cases prevent the liquid from passing the degasifying orifice 5. However, should some liquid pass the degasifying orifice 5 it will be prevented from further advance by the rib 3 so that it will finally return to the interior of the container via this degasifying orifice.

Further ribs 3a and 3b (FIGS. 5 and 6) result in additional security. These further ribs 3a and 3b which have smaller diameters than rib 3 are provided with staggered openings 25 in order to obtain a labyrinth-like effect and to allow back flow of liquid which reaches rib 3.

Figure 2:
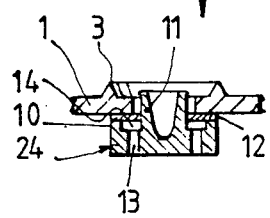
FIG. 2 is a partial section through a modified embodiment showing a detail in the area of the degasifying orifice.
Figure 3:
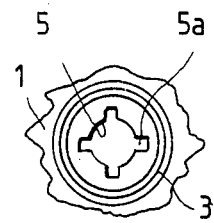
FIG. 3 is a partial top view of the base of the modified embodiment shown in FIG. 2 looking in the direction of arrow III in FIG. 2.

FIGS. 2 and 3 show a modified arrangement of a stepped plug 24. The shaft 11 of this plug 24 has a smooth surface so that the side wall of the degasifying orifice 5 is provided with recesses 5a in order to enable a gas flow through the orifice 5. A disc 12 made of a chemically resistant artificial fleece which is permeable for the gas flow but not for the liquid is disposed around shaft 11. The annular surface of plug 24 facing the lower side of base 1 is provided with an annular groove 14. The recesses 5a end opposite this annular groove 14 only separated from this groove 14 by disc 12. The cover plate 10 of plug 24 is provided with through bores 13 opening into the annular groove 14.

Figure 4:
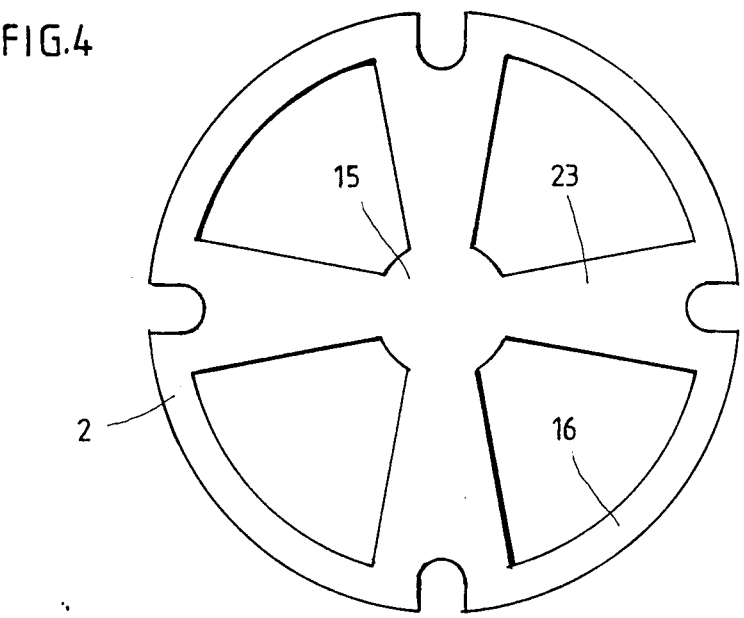
FIG. 4 is a view of the diaphragm-like spring element.

The spring element 2 resting upon rib 3 or ribs 3, 3a, 3b, respectively, is shown more in detail in FIG. 4. The spring element 2 has a circular central portion 15. The diameter of this central portion 15 is somewhat larger than the diameter of ribs 3 in order to obtain a reliable sealing between rib 3 and spring element 2. Radial arms 23 connect the central portion 15 with an annular rim portion 16. The width of the arms 23 increases correspondingly to the increasing distance from the central portion 15. The base 1 is provided with a flat cavity having a stepped side wall so as to form two shoulders 20 and 22. The shoulder 22 next to the bottom of the cavity is situated opposite the outer annular portion 16 of spring element 2. The other shoulder 20 is provided with cylindrical fastening lugs 21 which are suitable for extending through bores provided in the rim portion of a cover plate 17 and for establishing a lasting connection between this cover plate 17 and the base 1 by means of thermal or ultrasonic welding. The cover plate 17 has an annular projecting portion 18 suitable for clamping the annular portion of the spring element 2 between this projecting portion 18 and the shoulder 22 of the base 1.

The spring element 2 on the one side and the arrangement of the ribs 3, 3a, 3b and the projecting portion 18 on the other side are designed in such a manner that the spring element is subject to a preload which corresponds with the intended opening pressure of the valve. This preload may be changed by changing the axial dimension of the projecting portion 18, i.e. by using one out of a number of cover plates 17 having projecting portions 18 of different axial dimensions. The annular portion 16 of the spring element 2 always abuts on the front face 19 of the projecting portion 18, whereas it does not abut on the shoulder 22. There must be a sufficient clearance between the spring element 2 and the shoulder 22 in order to allow the spring element 2 to move by the influence of gas pressure.

What is claimed is:

1. A degasifying valve for storage and/or transport containers especially for storing and/or transportation of dangerous liquids, comprising a valve housing having a base provided with a degasifying orifice, the downstream mouth of said orifice being surrounded by a valve seat formed by at least one substantially knife-edge like ring-shaped endless rib, a diaphragm-like spring element biased into sealing contact with said valve seat and covering at least the area enclosed by said valve seat, and means for supporting the upper peripheral edge of said diaphragm element so that the lower peripheral edge of said diaphragm element is spaced from the valve housing to permit free movement at its peripheral edge.

2. A degasifying valve as claimed in claim 1, wherein the valve seat encloses at least one inner annular rib, said inner rib being interrupted by at least one opening.

3. A degasifying valve as claimed in claim 1, comprising at least two inner ribs having different diameters and a staggered arrangement of their openings.

4. A degasifying valve as claimed in claim 1, wherein the spring element has a central portion covering at least the area enclosed by the valve seat.

5. A degasifying valve as claimed in claim 1, wherein the spring element has a central portion covering at least the area enclosed by the valve seat, an annular rim portion, and a number of arms connecting the central portion with the rim portion.

6. A degasifying valve as claimed in claim 6, wherein the arms extend in a radial direction and their width increases corresponding to the increasing distance from the central portion.

7. A degasifying valve as claimed in claim 1, wherein a plug is provided with a shaft and a cover plate, said shaft engaging the degasifying orifice and said cover plate covering the upstream mouth of the degasifying orifice, one of the shaft and the side wall of said orifice being provided with grooves extending in the direction of gas flow through said orifice, and one of the surface of the cover plate facing the base and the surface of the base facing the cover plate being profiled in order to form a flow path between the periphery of the cover plate and said grooves.

8. A degasifying valve as claimed in claim 7, wherein a layer made of a material permeable to gas is placed between said cover plate and said orifice.

9. A degasifying valve as claimed in claim 8, wherein said layer is made of a chemically resistant artificial fleece permeable to gas but impermeable to liquids.

10. A degasifying valve as claimed in claim 8, wherein the cover plate is provided with through bores opening into said layer.

11. degasifying valve as claimed in claim 10, wherein the surface of the cover plate facing said layer is provided with an annular groove, said bores opening into said annular groove.

12. A degasifying valve as claimed in claim 1, wherein the spring element is provided with a rim portion having a larger diameter than the valve seat, a thrust member supported by said base biasing said rim portion in an upstream direction to such an extend that the biasing force equals the intended valve opening pressure.

13. A degasifying valve as claimed in claim 12, wherein said base is provided with a flat cavity, the degasifying orifice passing through the bottom of said cavity, and the thrust member being a cover plate covering said cavity.

14. A degasifying valve as claimed in claim 13, wherein the side wall of the cavity is provided with a shoulder supporting the cover plate, and wherein the cover plate is provided with an annular projection facing said rim portion of the spring element, the cover plate being secured to said base.

15. A degasifying valve as claimed in claim 14, wherein said base is provided with fastening lugs and wherein said cover plate and said base are connected by means of said fastening lugs and by means of thermal or ultrasonic welding.

16. In combination a storage and/or transport container and a degasifying valve as claimed in claim 1.

17. A degasifying valve as claimed in claim 1, wherein a plug is provided with a shaft and a cover plate, said shaft engaging the degasifying orifice and said cover plate covering the upstream mouth of the degasifying orifice, the shaft and side wall of said orifice being provided with grooves extending in the direction of gas flow through said orifice, and one of the surface of the cover plate facing the base and the surface of the base facing the cover plate being profiled in order to form a flow path between the periphery of the cover plate and said grooves.

* * * * *